United States Patent
Kulkarni et al.

(10) Patent No.: US 11,563,312 B2
(45) Date of Patent: Jan. 24, 2023

(54) BASE BRACKET AND AN ARRANGEMENT FOR MOUNTING A DEAD FRONT FOR AN ELECTRICAL PANELBOARD

(71) Applicant: APPLETON GRP LLC, Rosemont, IL (US)

(72) Inventors: Rahul L Kulkarni, Pune (IN); Andrey M. Shashin, Skokie, IL (US); William G. Leber, Vernon Hills, IL (US)

(73) Assignee: Appleton Grp LLC, Rosemont, IL (US)

( * ) Notice: Subject to any disclaimer, the term of this patent is extended or adjusted under 35 U.S.C. 154(b) by 372 days.

(21) Appl. No.: 16/898,676

(22) Filed: Jun. 11, 2020

(65) Prior Publication Data
US 2020/0395740 A1    Dec. 17, 2020

(30) Foreign Application Priority Data
Jun. 11, 2019   (IN) .............................. 201921023099

(51) Int. Cl.
| | |
|---|---|
| *H02B 1/06* | (2006.01) |
| *H02B 1/38* | (2006.01) |
| *H02B 1/44* | (2006.01) |
| *H02G 3/08* | (2006.01) |
| *E05D 11/00* | (2006.01) |
| *E05D 5/02* | (2006.01) |

(52) U.S. Cl.
CPC .............. *H02B 1/066* (2013.01); *E05D 5/02* (2013.01); *E05D 11/00* (2013.01); *H02B 1/38* (2013.01); *H02B 1/44* (2013.01); *H02G 3/08* (2013.01); *E05Y 2900/606* (2013.01)

(58) Field of Classification Search
CPC . H02B 1/066; H02B 1/06; H02B 1/38; H02B 1/144; H02G 3/08; H02G 3/081; H02G 3/14
See application file for complete search history.

(56) References Cited

U.S. PATENT DOCUMENTS

| | | | | |
|---|---|---|---|---|
| 7,348,499 | B1 * | 3/2008 | Cox ........................ | H02G 3/081 |
| | | | | 174/561 |
| 9,325,158 | B2 | 4/2016 | Nguyen et al. | |
| 10,069,284 | B1 * | 9/2018 | Paul .......................... | H02B 1/44 |
| 2002/0139555 | A1 * | 10/2002 | Dodds ...................... | H02B 1/44 |
| | | | | 174/50 |
| 2011/0310534 | A1 | 12/2011 | Cosley et al. | |
| 2015/0263492 | A1 | 9/2015 | Nguyen et al. | |
| 2017/0310091 | A1 | 10/2017 | Shimabukuro et al. | |

FOREIGN PATENT DOCUMENTS

IN        201621018542        12/2017

* cited by examiner

*Primary Examiner* — Hoa C Nguyen
*Assistant Examiner* — Amol H Patel
(74) *Attorney, Agent, or Firm* — McDonnell Boehnen Hulbert & Berghoff LLP

(57) ABSTRACT

A hinged dead front for an enclosure of an electrical panelboard, said enclosure defined by a rear panel, an operative left side panel, an operative right side panel and a door, wherein the rear panel of said enclosure is provided with hinged mounting bracket assemblies on which said dead front is hingeably mounted; and latch stopping bracket assemblies configured to engage with locking elements fitted on said dead front.

7 Claims, 7 Drawing Sheets

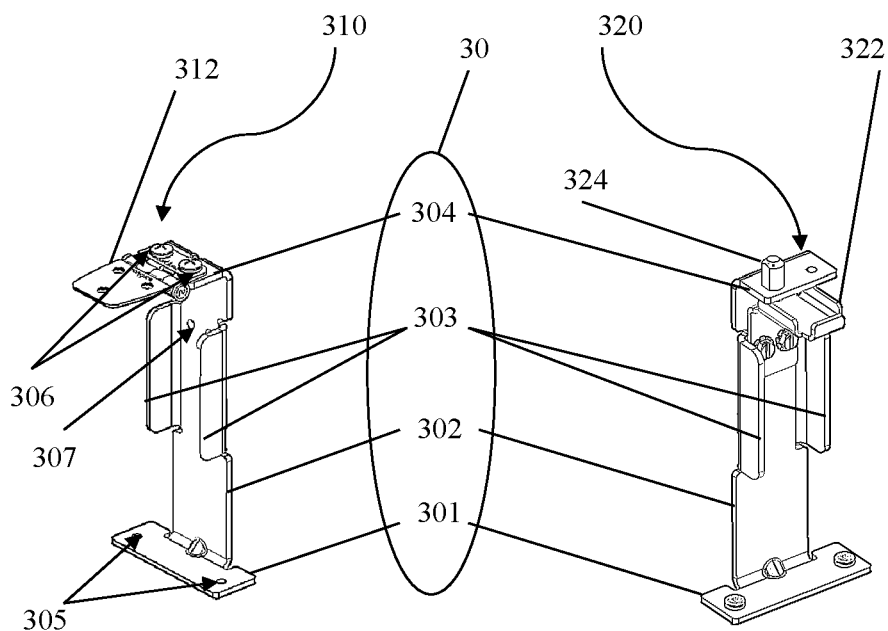
FIGURE 3a
FIGURE 3b
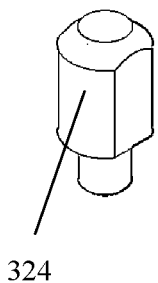
FIGURE 3c

BASE BRACKET AND AN ARRANGEMENT FOR MOUNTING A DEAD FRONT FOR AN ELECTRICAL PANELBOARD

RELATED APPLICATIONS

This application claims priority to Indian Patent Application No. 201921023099 entitled "A BASE BRACKET AND AN ARRANGEMENT FOR MOUNTING A DEAD FRONT FOR AN ELECTRICAL PANELBOARD" filed on Jun. 11, 2019, the contents of which are incorporated by reference herein in their entirety.

FIELD

The present disclosure relates to the field of electrical panelboards. More specifically, the present disclosure relates to arrangements for mountings for dead fronts for electrical panelboards.

Definitions

As used in the present disclosure, the following term is generally intended to have the meaning as set forth below, except to the extent that the context in which they are used indicate otherwise.

The expression 'a dead front' used hereinafter in this specification refers to, but is not limited to, a safety feature, usually in the form of a sheet with apertures provided with an electrical distribution panelboard, which allows an operator to externally access switches and the like without exposure to live parts such as bus bars, connection points of circuit breakers and all applicable connections to various electrical appliances in the panel.

BACKGROUND

The background information herein below relates to the present disclosure but is not necessarily prior art.

Existing method uses a dead front for an electrical panelboard which is being installed on four standoffs further fixed on the mounting panel. The dead front covers all live components and restricts direct access to live parts. Such a dead front is disclosed in the Indian patent application numbered 201621018567.

Existing dead fronts allow a user to remove the dead front from the panelboard to obtain access inside to components for operation/maintenance.

The cut-out provided to access toggles are larger which exposes live terminals. For maintenance/servicing, the user needs to remove the entire dead front every time to access internal components. The dead front is mounted on dead posts, which makes it difficult for alignment during reinstallation. The dead front is secured on the dead posts with the help of loose nuts, which results in the possibility in falling out in panelboards or loss in the field. For removing loose nuts, tools are required and the tools need to be carried every time. Moreover, separate cut-outs need to be provided for wire routing.

Thus, there is a need of an arrangement for mounting for a dead front for an electrical panelboard, which ameliorates the aforementioned issues.

OBJECTS

Some of the objects of the present disclosure, which at least one embodiment satisfies, are as follows:

A primary object of the present disclosure is to provide an arrangement for mounting for a dead front for an electrical panelboard.

Another object of the present disclosure is to provide an arrangement for mounting for a dead front for an electrical panelboard, which reduces the number of cut-outs covering live parts inside the enclosure of the panelboard.

Yet another object of the present disclosure is to provide an arrangement for mounting for a dead front for an electrical panelboard, which eliminates the requirement of alignment when assembling.

Still another object of the present disclosure is to provide an arrangement for mounting for a dead front for an electrical panelboard, which eliminates loose nuts, thus, making assembly simpler.

Yet another object of the present disclosure is to provide an arrangement for mounting for a dead front for an electrical panelboard, which is easy to open and close.

Other objects and advantages of the present disclosure will be more apparent from the following description, which is not intended to limit the scope of the present disclosure.

SUMMARY

A hinged dead front for an enclosure of an electrical panelboard is provided, said enclosure defined by a rear panel, an operative left side panel, an operative right side panel and a door, wherein the rear panel of said enclosure is provided with hinged mounting bracket assemblies on which said dead front is hingeably mounted; and latch stopping bracket assemblies configured to engage with locking elements fitted on said dead front.

BRIEF DESCRIPTION OF ACCOMPANYING DRAWING

The arrangement for mounting for a dead front for an electrical panelboard of the present disclosure will now be described with the help of the accompanying drawing, in which:

FIG. 3a illustrates a hinge mounting bracket assembly of the present disclosure;

FIG. 3b illustrates a latch stopping bracket assembly of the present disclosure;

FIG. 3c illustrates the alignment pin of FIG. 3b;

FIG. 4a illustrates a dead front of the present disclosure;

FIG. 4b illustrates a zoomed-in view of FIG. 4a showing the dead front of FIG. 4a;

FIG. 4c illustrates a zoomed-in view of the latch arrangement of FIG. 4a;

FIG. 6b illustrates a zoomed-in view showing wires routed through the cut-out of FIG. 6a.

LIST OF REFERENCE NUMERALS

Figure 1:
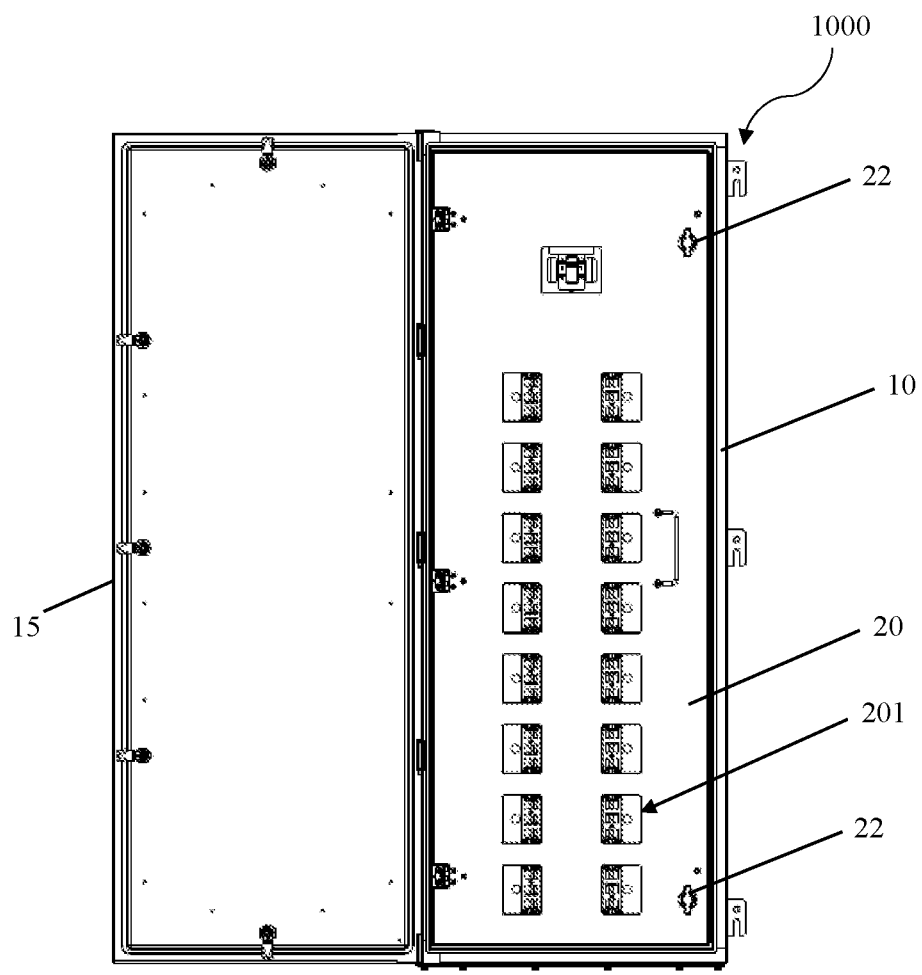
FIG. 1 illustrates an electric panelboard with a dead front of the present disclosure.
Figure 2A:
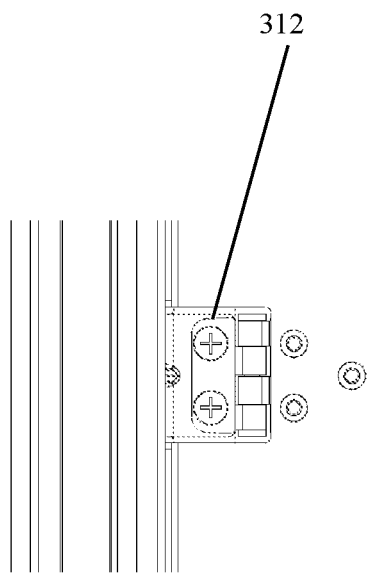
FIG. 2a illustrates a zoomed-in view of FIG. 1 showing the hinged mounting bracket assembly of FIG. 1.
Figure 2B:
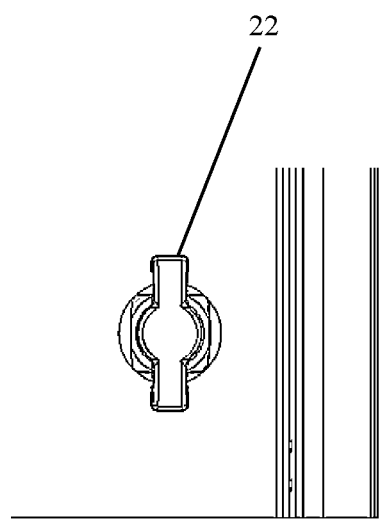
FIG. 2b illustrates a zoomed-in view of FIG. 1 showing the latch of FIG. 1.

1000 electrical panelboard
10 enclosure 101 rear panel
102 operative left side panel
103 operative right side panel
15 door
20 dead front
201 access window
202 first cut-out
203 second cut-out
22 latch
221 knob element
222 latch element
30 base bracket
301 foot
302 trunk
303 arm
304 head
305 first mounting holes
306 second mounting holes
307 third mounting holes
310 hinged mounting bracket assembly
312 hinge
320 latch stopping bracket assembly
322 latch lip
324 alignment pin

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an" and "the" may be intended to include the plural forms as well, unless the context clearly suggests otherwise. The terms "comprises", "comprising", "including" and "having" are open-ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "mounted on", "engaged to", "connected to" or 'coupled to" another element, it may be directly on, engaged, connected or coupled to the other element. As used herein, the term "and/or" includes any and all combinations of one or more of the associated listed elements.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Terms such as "inner", "outer", "beneath", "below", "lower", "above", "upper" and the like, may be used in the present disclosure to describe relationships between different elements as depicted from the figures.

There is a need of an arrangement for mounting for a dead front for an electrical panelboard, which reduces the number of cut-outs covering live parts inside the enclosure of the panelboard, eliminates the requirement of alignment when assembling, eliminates loose nuts thus making assembly simpler and is easy to open and close.

The present disclosure envisages an arrangement for mounting for a dead front 20 for an electrical panelboard 1000, as illustrated through FIGS. 1 to 7.

The electrical panelboard 1000 is provided with an enclosure 10, as shown in FIG. 1. The enclosure 10 encloses electrical components including switch gear, control circuits, bus bars, terminals and the like. The enclosure 10 is defined by a rear panel 101, an operative left side panel 102, an operative right side panel 103 and a door 15. For an electrician handling the switches such other controls of the electrical panelboard 1000, a dead front 20 is provided. The dead front 20 covers the live electrical components such as bus bars, live wires and the like, while allowing external access to switches and knobs. Access windows 201 are formed at appropriate locations on the dead front 20. The dead front 20 is a box-type sheet metal plate having the edges folded at right angles towards an operative external side of the enclosure 10.

According to an aspect of the present disclosure, the dead front 20 is hingeably mounted on hinged mounting bracket assemblies 310. Each of the hinged mounting bracket assemblies 310 comprises a base bracket 30 and a hinge 312. The hinged mounting bracket assemblies 310 are fitted onto the rear panel 101 of the electrical enclosure 10. In an embodiment, the hinged mounting bracket assemblies 310 are disposed along a straight vertical line in the vicinity of one of the operative side panels of the enclosure 10.

According to another aspect of the present disclosure, the dead front 20 has at least one latch 22 fitted in the vicinity of a lateral edge opposite to the side where the hinged mounting bracket assemblies 310 are disposed. In an embodiment, the latch 22 has a winged knob element 221. A latch stopping bracket assembly 320 is provided per latch 22, wherein the latch stopping bracket assembly 320 is fitted onto the rear panel 101 of the enclosure 10. Each of the latch stopping bracket assemblies 320 comprises a base bracket 30 and a latch lip 322. In an embodiment, the latch stopping bracket assemblies 320 are disposed along a straight vertical line in the vicinity of one of the operative side panels of the enclosure 10.

According to an aspect of the present disclosure, the present disclosure envisages base brackets 30 as shown in FIGS. 3a and 3b. Each of the base brackets 30 comprises a foot 301, a trunk 302, a pair of arms 303 and a head 304. In an embodiment, the base bracket 30 is a sheet metal component formed by stamping and bending a sheet metal blank, preferably low carbon galvanized steel. The arms 303 extend perpendicular to the surface of the trunk 302, which enhances stiffness of the base bracket 30 against the compressive, torsional and bending loads. The bracket 30 is also provided with a pair of first mounting holes 305, a pair of second mounting holes 306 and a pair of third mounting holes 307. The foot 301 can be welded using suitable techniques such as spot welding, or fixed using threaded fasteners passed through the first mounting holes 305, to the rear panel 101 of the enclosure 10. While the arms 303 are formed substantially in a half section of the trunk 302 close to the head 304 of the base bracket 20, the half section of the trunk 302 close to the foot 301 remains flat. Wires can be routed along the unbent (i.e., flat) section of the trunk 302 of the base bracket 30. Thus, the provision of mounting holes 305, 306, 307 at multiple surfaces of the base bracket 30, the enhancement of stiffness done by providing the arms 303, the provision of a gap between the arms 303 and the foot 301, among others, are the features that make the base bracket 30 of the present disclosure highly versatile.

In accordance with an application of the base brackets 30, hinges 312 can be attached to the head 304 by passing threaded fasteners through the second mounting holes 306, thereby forming a hinged mounting bracket assembly 310, as shown in FIG. 3a. The hinge 312 has two flaps—one attachable to the head 304 of the base bracket 30 and the other attachable to the dead front 20. The height (i.e., distance between external surface of the head 305 and external surface of the foot 301) of the base bracket 30 is greater than the maximum operative dimension of an electrical component encased in the enclosure 10, as measured from the surface of the rear panel 101.

In accordance with another application of the base brackets 30, latch lips 322 can be attached to the trunk 302 by passing threaded fasteners through the third mounting holes 307, thereby forming a latch stopping bracket assembly 320, as shown in FIG. 3b. The latch lip 322 has an L-shaped cross-section, with a base element attachable to the trunk 302 of the base bracket 30 and a lip element protruding away from the trunk 302 and engageable with a latching element 222 of the latch 22. Further, the latch stopping bracket assembly 320 is also provided with an alignment pin 324 which is fixed onto a second mounting hole 306 of the bracket 30. The alignment pin 324 is engageable with a complementary formation (e.g., a hole) on the dead front 20. The dead front 20 is aligned for mounting by engaging the complementary formations with corresponding alignment pins 324 and hence fitted on the hinged mounting bracket assemblies 310. By twisting the externally accessible knob element 221 of the latch 22, the latching element 222 is angularly displaced and brought behind the lip element of the lip latch 322 for abuttably engaging with the lip element, for locking the dead front 20 against opening thereof. The height (i.e., distance between external surface of the head 305 and external surface of the foot 301) of the base bracket 30 is greater than the maximum operative dimension of an electrical component encased in the enclosure 10, as measured from the surface of the rear panel 101.

Figures 4A, 4B, 4C:
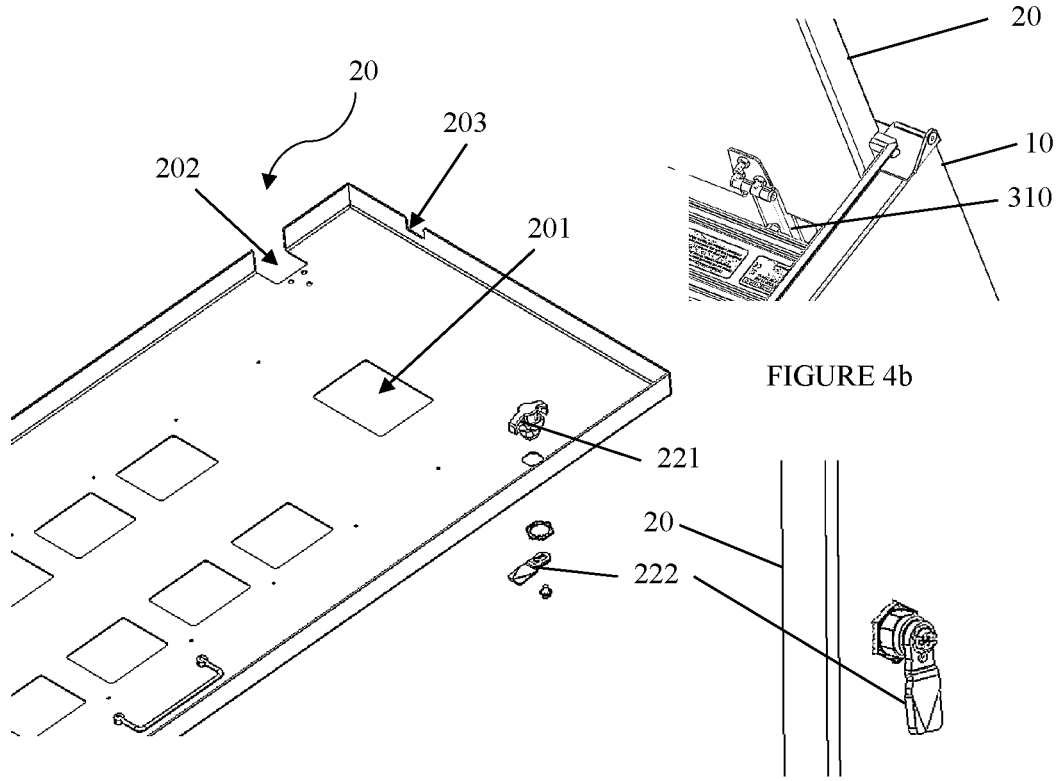
Figure 5:
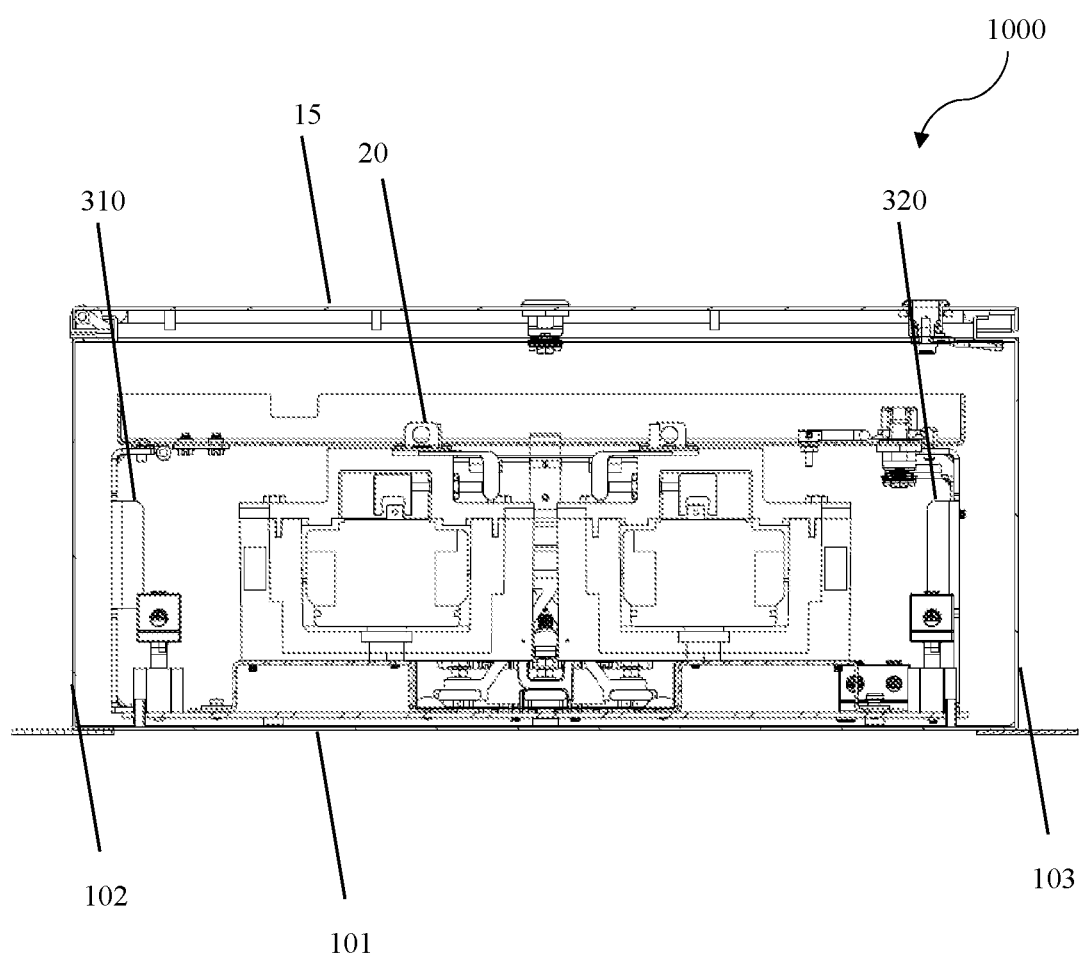
FIG. 5 illustrates a sectional view of the arrangement for mounting for an electrical panelboard of the present disclosure with the dead front in a closed position.
Figure 6A:
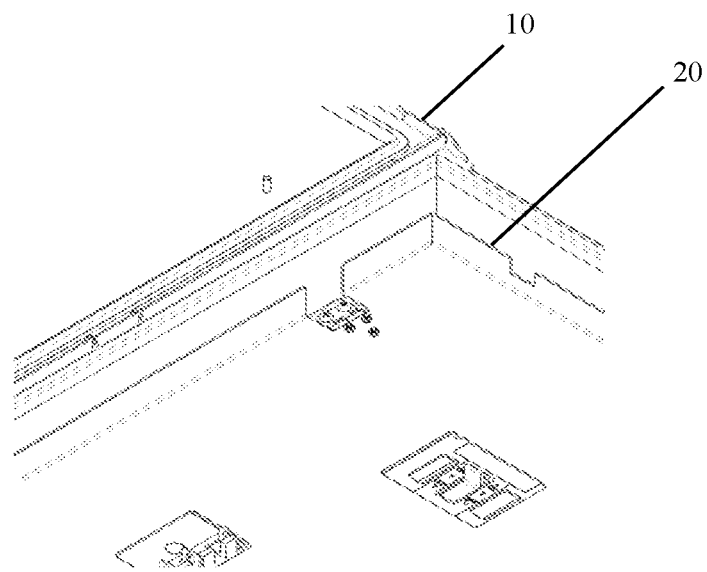
FIG. 6a illustrates a zoomed-in view showing a cut-out for the bracket.
Figure 6B:
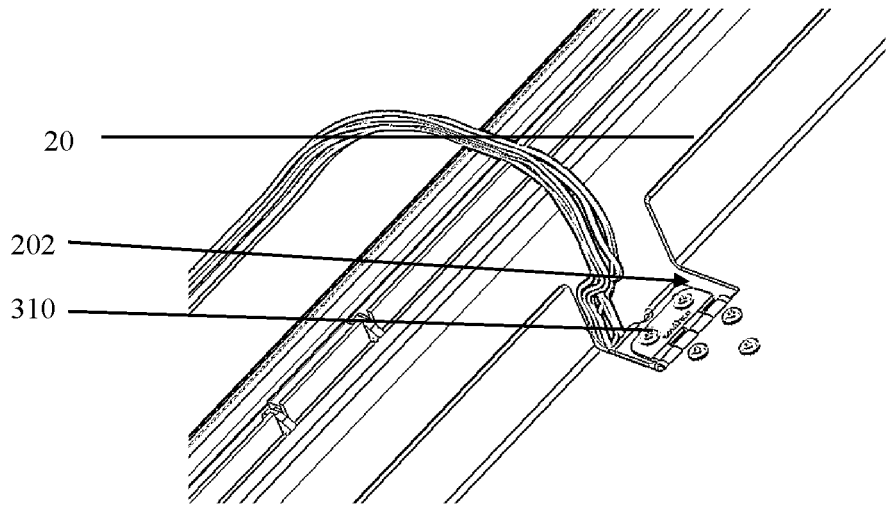
Figure 7:
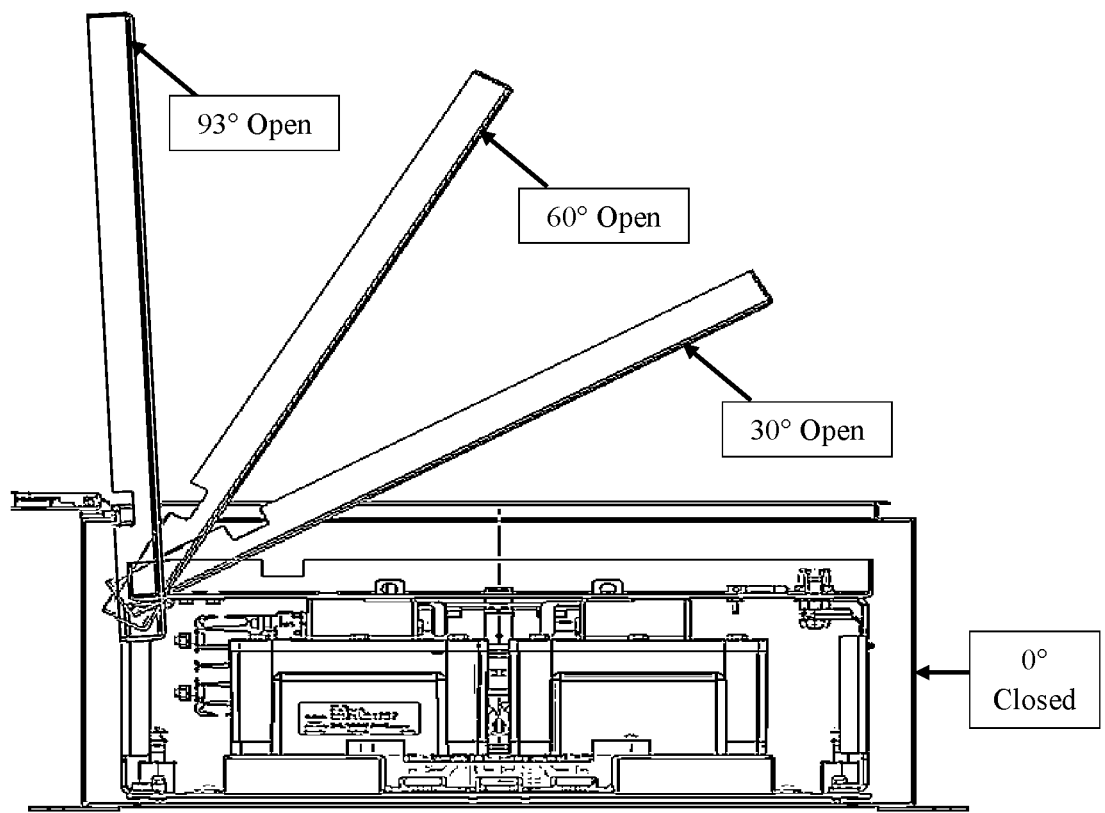
FIG. 7 illustrates an opening sequence of the dead front of the present disclosure.

According to still another aspect of the present disclosure, the dead front 20 of the present disclosure is provided with a plurality of first cut-outs 202 at the lateral edge along which the dead front 20 is hingeably coupled to the hinged mounting bracket assemblies 310, as shown in FIG. 4a. The first cut-outs 202 are provided specifically at the locations where the hinged mounting bracket assemblies 310 are fixed. Wires such as LED wires can be routed through the first cut-outs 202.

According to yet another aspect of the present disclosure, after opening the door 15 of the enclosure 10, the dead front 20 can be swivelably opened through an angle greater than 90°. A pair of second cut-outs 203 is provided at the operative top and the operative bottom edges of the dead front 20. The second cut-outs 203 are configured to engage with the side panel of the enclosure 10 adjacent to the hinged mounting bracket assemblies 310, which facilitates opening of the dead front 20 through an angle greater than 90°, without hindrance due to the side panel. In an embodiment, the dead front 20 opens through an angle of 93°. The various opening states of the dead front 20 relative to the plane of closed condition are sequentially illustrated in FIG. 7.

Thus, the dead front 20 of the present disclosure is integral with the enclosure 10 of the electrical panelboard 1000. Opening and closing of the dead front 20 for accessing contents of the enclosure 10, without requiring complete removal of the dead front 20, is made possible. The method of assembly of the dead front 20 with the enclosure 10 is made easy and convenient due to provision of the versatile base brackets 30. The hinges 312, fixed on the base brackets 30 to form the hinged mounting bracket assemblies 310, can be off-the-shelf hinges.

The configuration of the dead front 20 of the present disclosure is suitable for top and bottom feed panel offerings.

The base bracket 30 of the present disclosure can be envisaged for implementation in a variety of structural and functional applications, without being restricted to the mounting arrangement of the dead front 20 as described hereinabove.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCEMENTS

The present disclosure described herein above has several technical advantages including, but not limited to, the realization of an arrangement for mounting for a dead front for an electrical panelboard, wherein:
 the dead front is integral with panelboard and the user need not remove the dead front completely during maintenance;
 alignment issues are eliminated;
 use of loose nuts is eliminated and falling out hardware in panelboard/field is further eliminated;
 a knob is provided on latch which facilitates easy opening and closing simply by hand and without additional tools required; and
 cut-outs provided for the hinge can be used for wire routing.

The foregoing disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

What is claimed is:

1. A hinged dead front for an enclosure of an electrical panelboard, said enclosure defined by a rear panel, an operative left side panel, an operative right side panel and a door, wherein:
   a. the rear panel of said enclosure is provided with hinged mounting bracket assemblies on which said dead front is hingeably mounted; and
   b. latch stopping bracket assemblies configured to engage with locking elements fitted on said dead front;
   wherein each of said bracket assemblies comprises a base bracket, said base bracket being configured to be mounted on said rear panel of said enclosure; and
   wherein said base bracket is defined by a trunk having a foot, a pair of arms and a head, wherein said foot, said arms and said head are bent at right angles to the surface of said trunk.

2. The dead front as claimed in claim 1, wherein a height of said base bracket is greater than the maximum operative dimension of an electrical component encased in said enclosure, as measured from the surface of the rear panel.

3. The dead front as claimed in claim 1, wherein a half section of said trunk adjacent to said foot is unbent.

4. The dead front as claimed in claim 1, wherein each of said latch stopping bracket assemblies includes an alignment pin for aiding alignment of said dead front during installation.

5. The dead front as claimed in claim 1, wherein said base bracket of said latch stopping brackets assemblies is provided with a latch lip configured to engage with said locking elements.

6. A hinged dead front for an enclosure of an electrical panelboard, said enclosure defined by a rear panel, an operative left side panel, an operative right side panel and a door, wherein:
   a. the rear panel of said enclosure is provided with hinged mounting bracket assemblies on which said dead front is hingeably mounted; and
   b. latch stopping bracket assemblies configured to engage with locking elements fitted on said dead front;
   wherein said dead front is provided with cut-outs at the operative top and the operative bottom edges for preventing interference of said edges of said dead front with an adjacent operative side panel of said enclosure during opening said dead front.

7. The dead front as claimed in claim 6, wherein said dead front is configured to open through more than 90° from its closed position.

* * * * *